US008949255B1

(12) United States Patent
Faibish et al.

(10) Patent No.: US 8,949,255 B1
(45) Date of Patent: Feb. 3, 2015

(54) METHODS AND APPARATUS FOR CAPTURE AND STORAGE OF SEMANTIC INFORMATION WITH SUB-FILES IN A PARALLEL COMPUTING SYSTEM

(75) Inventors: Sorin Faibish, Newton, MA (US); John M. Bent, Los Alamos, NM (US); Percy Tzelnic, Concord, MA (US); Gary Grider, Los Alamos, NM (US); Aaron Torres, Los Alamos, NM (US)

(73) Assignees: EMC Corporation, Hopkinton, MA (US); Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 13/536,384

(22) Filed: Jun. 28, 2012

(51) Int. Cl.
*G06F 17/30* (2006.01)
(52) U.S. Cl.
USPC ........... 707/755; 707/764; 707/770; 707/809; 707/810
(58) Field of Classification Search
None
See application file for complete search history.

(56) References Cited

U.S. PATENT DOCUMENTS

| 8,352,429 B1* | 1/2013 | Mamidi et al. | 707/640 |
| 2004/0133577 A1* | 7/2004 | Miloushev et al. | 707/10 |
| 2007/0266037 A1* | 11/2007 | Terry et al. | 707/100 |
| 2009/0282068 A1* | 11/2009 | Shockro et al. | 707/101 |
| 2010/0287207 A1* | 11/2010 | Motoyama | 707/803 |
| 2011/0276692 A1* | 11/2011 | Waldman et al. | 709/226 |

OTHER PUBLICATIONS

Author: IBM; Title: "General Parallel File System—Advanced Administration Guide", Date: 2010; Publisher: IBM; Edition: Version 3 Release 4; Pertinent pp. i-156.*
Bent et al., PLFS: A Checkpoint Filesystem for Parallel Applications, International Conference for High Performance Computing, Networking, Storage and Analysis 2009 (SC09), Nov. 2009.
EMC Fast Cache, http://www.emc.com/collateral/software/white-papers/h8046-clariion-celerra-unified-fast-cache-wp.pdf, Oct. 2011.

* cited by examiner

*Primary Examiner* — Anh Tai Tran
(74) *Attorney, Agent, or Firm* — Ryan, Mason & Lewis, LLP (57) ABSTRACT

Techniques are provided for storing files in a parallel computing system using sub-files with semantically meaningful boundaries. A method is provided for storing at least one file generated by a distributed application in a parallel computing system. The file comprises one or more of a complete file and a plurality of sub-files. The method comprises the steps of obtaining a user specification of semantic information related to the file; providing the semantic information as a data structure description to a data formatting library write function; and storing the semantic information related to the file with one or more of the sub-files in one or more storage nodes of the parallel computing system. The semantic information provides a description of data in the file. The sub-files can be replicated based on semantically meaningful boundaries.

22 Claims, 6 Drawing Sheets

METHODS AND APPARATUS FOR CAPTURE AND STORAGE OF SEMANTIC INFORMATION WITH SUB-FILES IN A PARALLEL COMPUTING SYSTEM

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

FIELD

The present invention relates to parallel storage in high performance computing environments.

BACKGROUND

Parallel storage systems are widely used in many computing environments. Parallel storage systems provide high degrees of concurrency in which many distributed processes within a parallel application simultaneously access a shared file namespace.

Parallel computing techniques are used in many industries and applications for implementing computationally intensive models or simulations. For example, the Department of Energy uses a large number of distributed compute nodes tightly coupled into a supercomputer to model physics experiments. In the oil and gas industry, parallel computing techniques are often used for computing geological models that help predict the location of natural resources. One particular parallel computing application models the flow of electrons within a cube of virtual space by dividing the cube into smaller sub-cubes and then assigning each sub-cube to a corresponding process executing on a compute node.

Storage tiering techniques are increasingly used in parallel computing environments to more efficiently store the vast amounts of information. For example, the Symmetrix system from EMC Corporation is an enterprise storage array that optionally includes Fully Automated Storage Tiering (FAST). Storage tiering techniques typically combine Non-Volatile Random Access Memory (NVRAM), also referred to as flash memory, with more traditional hard disk drives (HDDs). Flash memory is used to satisfy the bandwidth requirements of a given system while the hard disk drives are used to satisfy the capacity requirements. Existing storage systems often store the data by serializing the data into linear arrays of bytes that are stored as sub-files. Metadata is stored with each file including a memory offset and length that indicate where the sub-file fits into the larger logical file.

A need exists for improved techniques for storing sub-files with semantically meaningful boundaries. A further need exists for improved techniques for storing sub-files with metadata that includes semantic information.

SUMMARY

Embodiments of the present invention provide improved techniques for storing files in a parallel computing system using sub-files with semantically meaningful boundaries. In one embodiment, a method is provided for storing at least one file generated by a distributed application in a parallel computing system, wherein the file comprises one or more of a complete file and a plurality of sub-files. The method comprises the steps of obtaining a user specification of semantic information related to the file; providing the semantic information as a data structure description to a data formatting library write function; and storing the semantic information related to the file with one or more of the sub-files in one or more storage nodes of the parallel computing system. The semantic information provides a description of data in the file. The sub-files can be replicated based on semantically meaningful boundaries.

According to a further aspect of the invention, the semantic information can be used to process a query and/or performing an analysis of the file. In addition, a replication strategy can be specified for each sub-file.

Advantageously, illustrative embodiments of the invention provide techniques for storing files in a parallel computing system using semantically meaningful boundaries. The semantic-based sub-files and semantic metadata permit the files and file replicas to be stored with reduced data processing and transfer bandwidth costs, and preserve valuable disk space.

These and other features and advantages of the present invention will become more readily apparent from the accompanying drawings and the following detailed description.

DETAILED DESCRIPTION

The present invention provides improved techniques for storing files in a hierarchical storage tiering system. Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "files" shall include complete files and portions of files, such as sub-files or shards.

According to one aspect of the invention, a file generated by a distributed application in a parallel computing system is stored as a plurality of semantically meaningful sub-files. In addition, the metadata for each file includes semantic information. A user can provide a specification of the semantic information related to the file. As discussed hereinafter, the semantic information can be provided as a data structure description to a data formatting library write function that will store the semantic information related to the file with one or more of the stored sub-files.

According to a further aspect of the invention, one or more replicas of the file are generated with different resolutions based on the semantic information. The file and corresponding replicas of the file can be stored in one or more storage nodes of a parallel computing system. In this manner, the parallel file system can export different views of the data dynamically based on the needs of different workloads. Bandwidth is improved by sending only the relevant subset of data that is required by a given application.

Storage tiering techniques are increasingly used in parallel computing environments to more efficiently store the vast amounts of information. For example, the Symmetrix system from EMC Corporation is an enterprise storage array that optionally includes Fully Automated Storage Tiering (FAST). Storage tiering techniques typically combine Non-Volatile Random Access Memory (NVRAM), also referred to as flash memory, with more traditional hard disk drives (HDDs). Flash memory is used to satisfy the bandwidth requirements of a given system while the hard disk drives are used to satisfy the capacity requirements.

Figure 1:
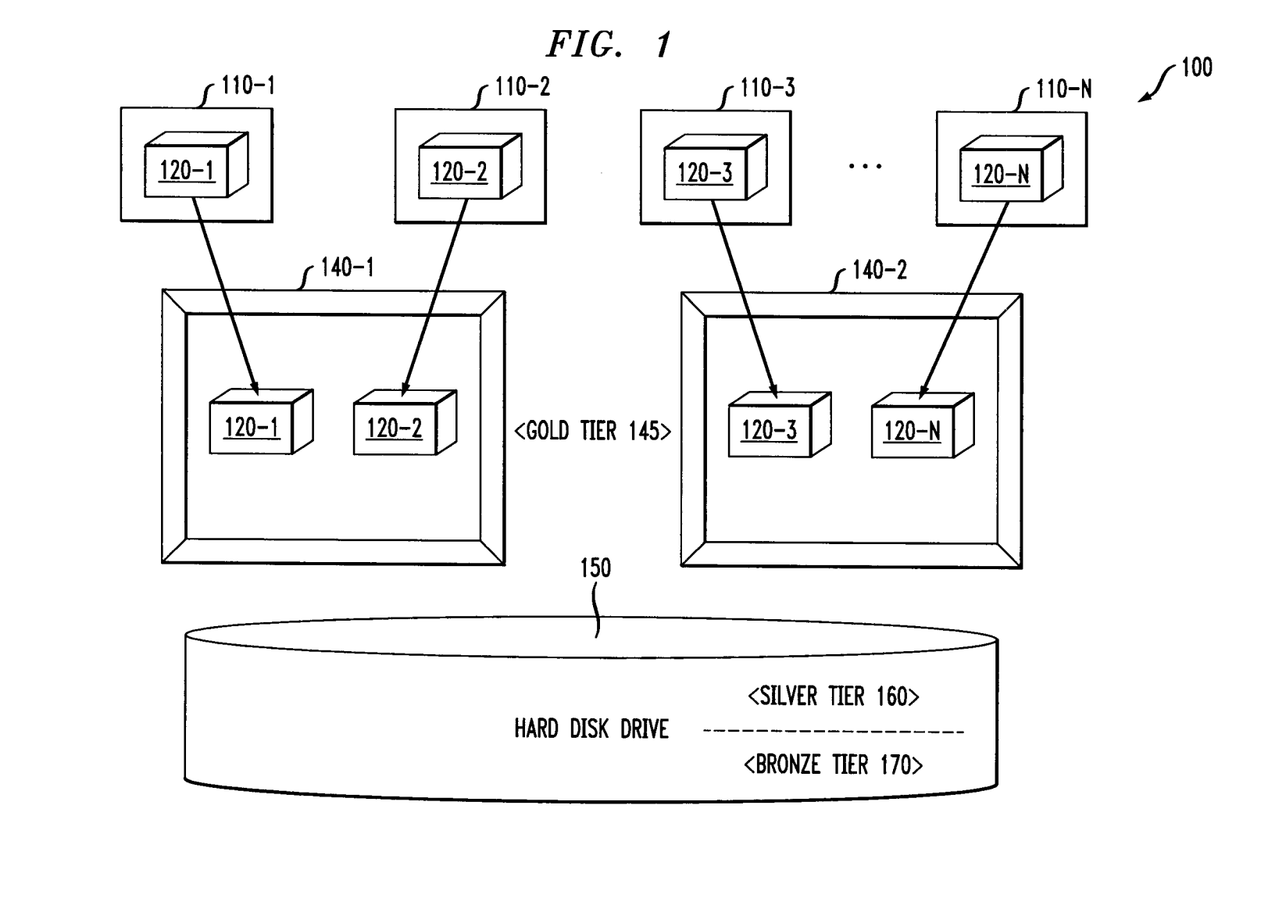
FIG. 1 illustrates an exemplary hierarchical storage tiering system that incorporates aspects of the present invention.

FIG. 1 illustrates an exemplary hierarchical storage tiering system 100 that incorporates aspects of the present invention. As shown in FIG. 1, the hierarchical storage tiering system 100 comprises a plurality of compute nodes 110-1 through 110-N (collectively, compute nodes 110) each having a portion 120-1 through 120-N of a distributed data structure or other information to store. For example, four compute nodes 110-1 through 110-4 can each process climate data for a different quadrant of a country, such as northeast, northwest, southeast and southwest quadrants. The compute nodes 110 optionally store the portions 120 of the distributed data structure in one or more nodes of the exemplary hierarchical storage tiering system 100, such as two exemplary flash based storage nodes 140-1, 140-2 (e.g., burst buffer nodes). The tier containing the burst buffer nodes 140-1, 140-2 may be referred to, for example, as a Gold Tier 145.

In addition, the exemplary hierarchical storage tiering system 100 optionally comprises one or more hard disk drives 150. The tier containing the hard disk drives 150 may be further divided, for example, into a Silver Tier 160 and a Bronze Tier 170. In one variation, the Bronze Tier 170 may be implemented, for example, using an optional tier of slower tape memory (not shown in FIG. 1). The tiers 145, 160, 170 may optionally be described by standard gold, silver, and bronze designations and may be differentiated by different bandwidths, different latencies, different reliabilities, and different capacities, in a known manner.

According to one aspect of the present invention, one or more nodes in the exemplary hierarchical storage tiering system 100, such as the compute nodes 110, the flash based storage nodes 140-1, 140-2 and the hard disk drives 150, generate one or more replicas of a file. The replicas can be generated, for example, by a processor, a microprocessor, a microcontroller, an application-specific integrated circuit (ASIC), a field-programmable gate array (FPGA) or other type of processing circuitry, as well as portions or combinations of such circuitry elements.

According to a further aspect of the invention, the file and the corresponding file replicas can be selectively stored on one or more of the flash based storage nodes 140-1, 140-2 and/or a hard disk drive (HDD) 150 (e.g., a parallel file system) based on automated tiering, or an application or user specification of how to store files in the exemplary hierarchical storage tiering system 100. Note that the burst buffers 140 might be an explicit delineated storage tier 145, as shown in FIG. 1, or they might be a fast buffer within another storage tier (for example, it could be memory on a compute node 140 or memory within the storage array 150).

As discussed hereinafter, a Parallel Log-Structured File System (PLFS) can make the placement decision automatically, as described in U.S. patent application Ser. No. 13/536,331, entitled "Storing Files in a Parallel Computing System Using List-Based Index to Indicate Replica Files," filed contemporaneously herewith and incorporated by reference herein, or it can be explicitly controlled by the application and administered a storage daemon. For a more detailed discussion of storage tiering based on a user or application specification, see, for example, U.S. patent application Ser. No. 13/536,289, entitled "Storing Files in a Parallel Computing System Based on User-Specification," filed contemporaneously herewith and incorporated by reference herein.

In a conventional PLFS implementation, data is first written to the flash based storage nodes 140 (also referred to as Solid State Device (SSD) nodes), and is then copied to the parallel file system 150. The data is removed from the flash based storage nodes 140 when capacity is needed. Aspects of the present invention extend the notion of a fast tier to include memory buffers and to include a deeper tiering which extends into the storage array itself. The full stack of tiers may be any subset, or the complete set, of: memory on the compute node 110, memory in a flash based storage node 140, solid state devices in a flash based storage node 140, or memory, SSD, fast disk, slow disk in a storage array, and a tape system.

The present invention recognizes that such storage tiering provides a new opportunity for generation of sub-files using semantically relevant boundaries, and for sub-file replication, for example, in one or more of the compute nodes 110, the flash based storage nodes 140-1, 140-2 and the hard disk drives 150, to selectively store and remove the replicated data and associated semantic information.

In one exemplary embodiment, the middleware file system that processes the data blocks as they are written into the flash based storage nodes is implemented using the Fully Automated Storage Tiering (FAST) system of EMC Corporation and the Parallel Log-Structured File System (PLFS), as modified herein to provide the features and functions of the present invention. See, for example, "EMC FAST Cache," http://www.emc.com/collateral/software/white-papers/h8046-clariion-celerra-unified-fast-cache-wp.pdf, or John Bent et al., "PLFS: A Checkpoint Filesystem for Parallel Applications," Intl Conf. for High Performance Computing, Networking, Storage and Analysis 2009 (SC09) (Nov. 2009), each incorporated by reference herein. Generally, conventional PLFS improves the efficiency of checkpoint techniques for parallel applications by inserting an interposition layer into the existing storage stack to rearrange the problematic access pattern associated with checkpoints.

Figure 2:
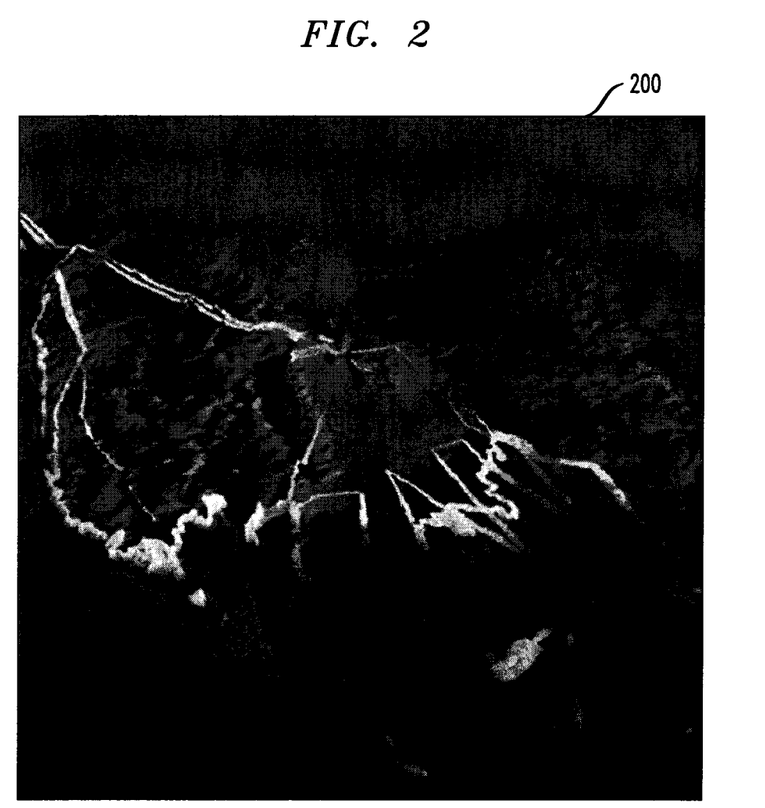
FIG. 2 illustrates an exemplary image associated with an application that simulates a model of an ocean.
Figure 3:
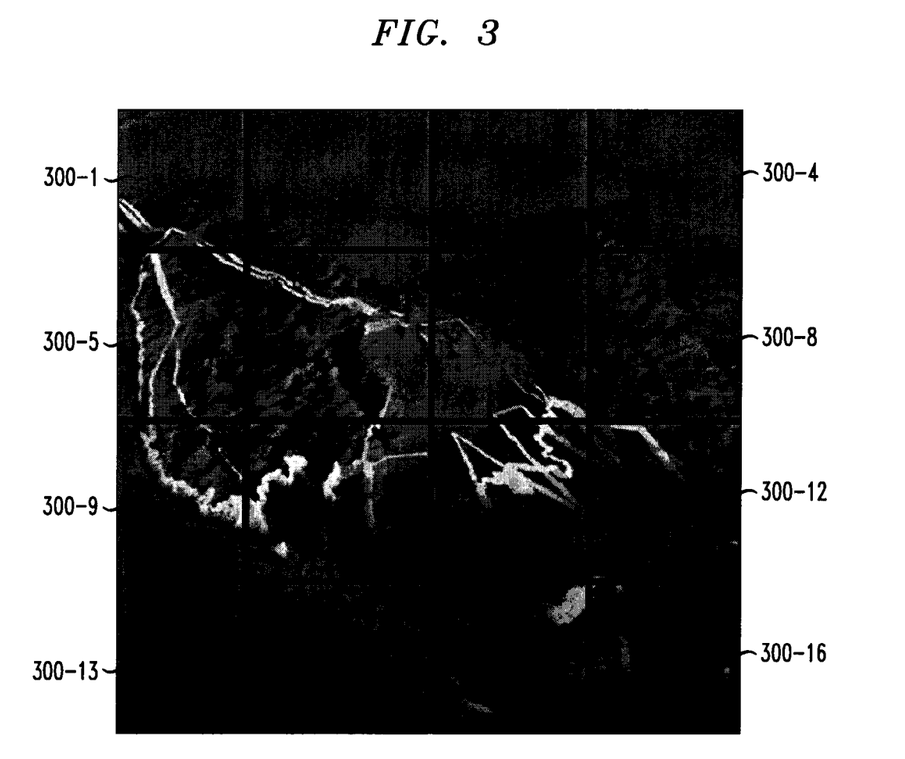
FIG. 3 illustrates an exemplary division of the image of FIG. 2 into a plurality of sub-images, based on semantically meaningful boundaries in accordance with aspects of the present invention.
Figure 4:
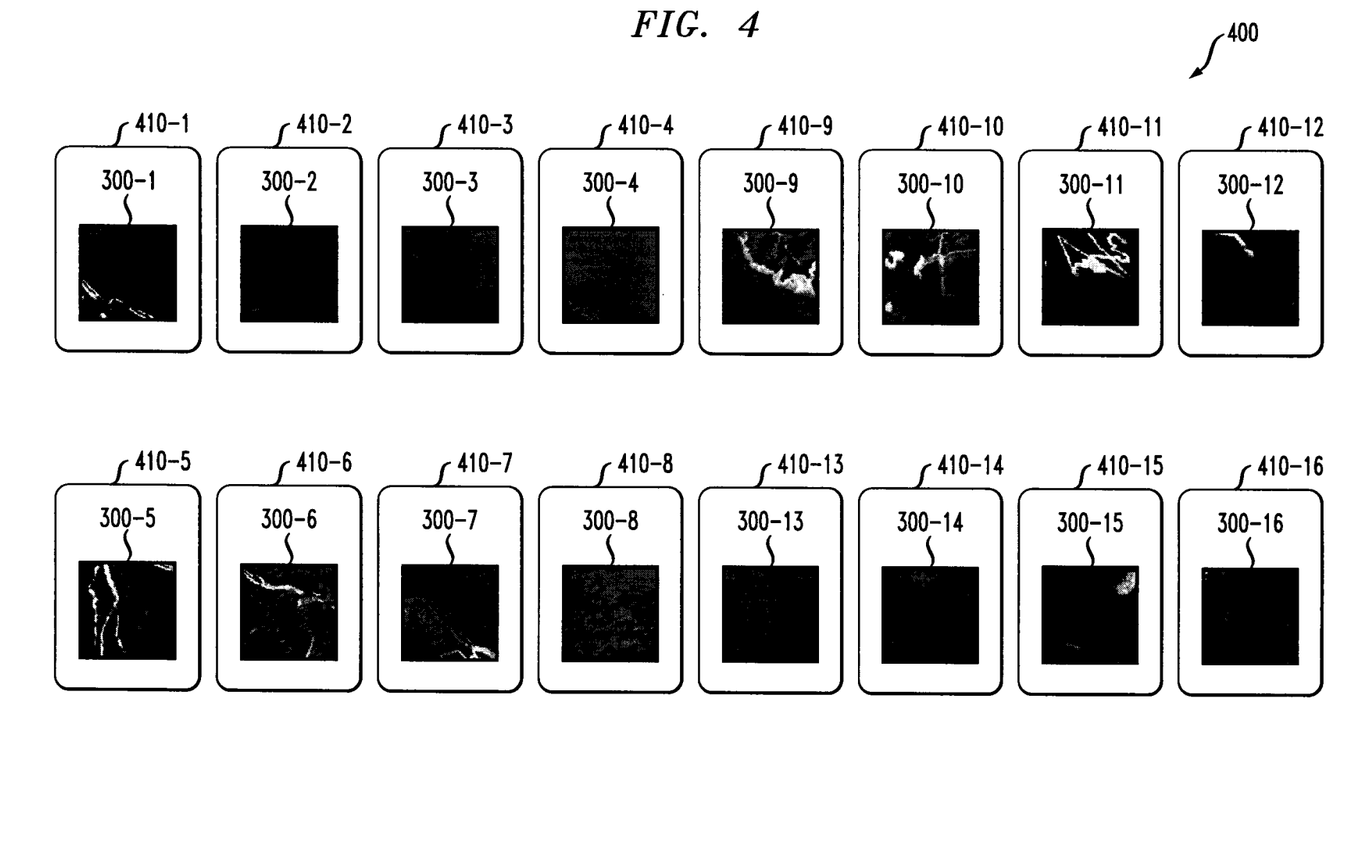
FIG. 4 illustrates an assignment of each of the plurality of sub-images of FIG. 3 to a corresponding compute node in an exemplary parallel computing system.

FIG. 2 illustrates an exemplary image 200 associated with an application that simulates a model of the ocean. FIG. 3 illustrates an exemplary division of the image 200 of FIG. 2 into a plurality of sub-images 300-1 through 300-N(N is equal to 16 in the exemplary embodiment of FIG. 3), based on semantically meaningful boundaries. The semantic information for each sub-image 300 might indicate, for example, that each sub-image 300 is associated with a different region or grid of the ocean. FIG. 4 illustrates an assignment of each of the plurality of sub-images 300-1 through 300-16 of FIG. 3 to a corresponding different compute node 410-1 through 410-16 in an exemplary parallel computing system 400.

Figure 5:
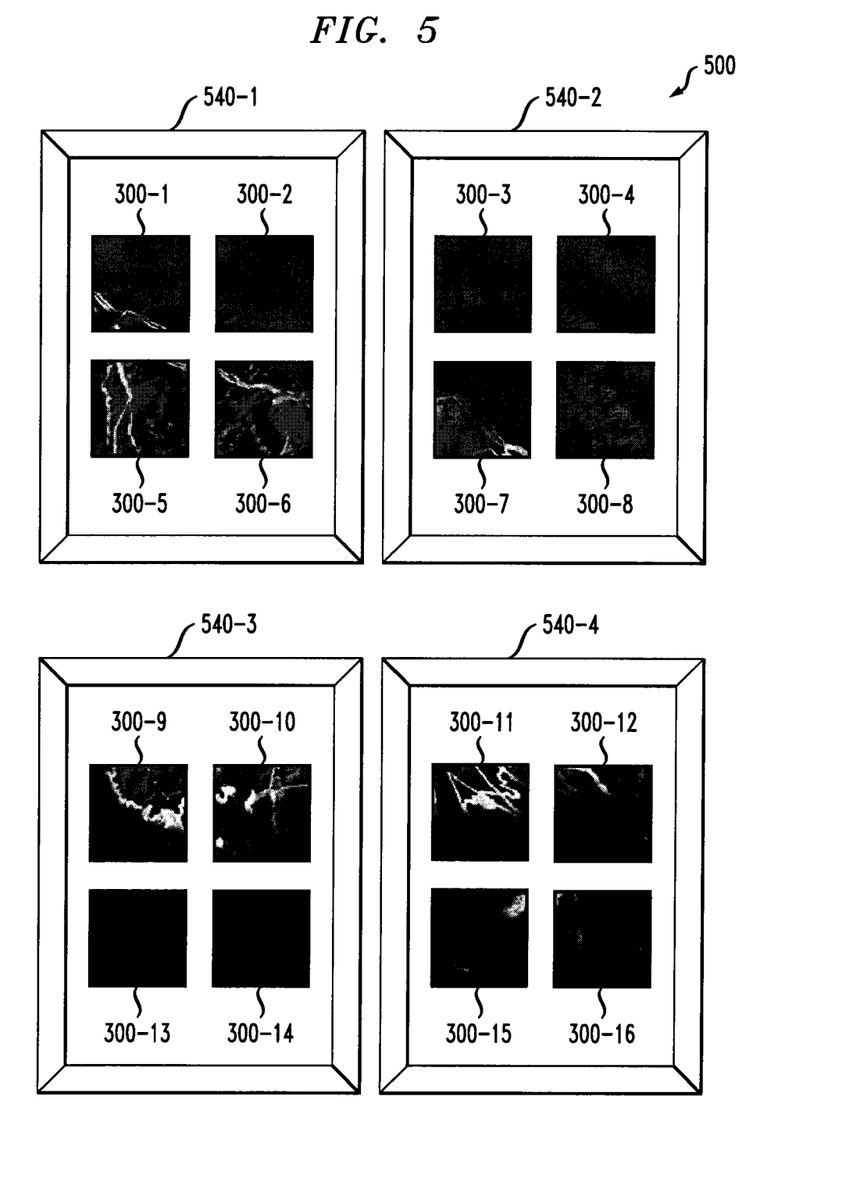
FIG. 5 illustrates a plurality of exemplary flash based storage nodes in an exemplary parallel computing system that processes the exemplary sub-images of FIG. 3.

FIG. 5 illustrates a plurality of exemplary flash based storage nodes 540-1 through 540-4 in an exemplary parallel computing system 500. The exemplary flash based storage nodes 540 may comprise, for example, flash-based burst buffers. As shown in FIG. 5, the plurality of sub-images 300-1 through 300-16 of FIG. 3 are assigned to different flash based storage nodes 540 in the exemplary parallel computing system 500.

Storing File as Semantically Meaningful Sub-Files

Figure 6:
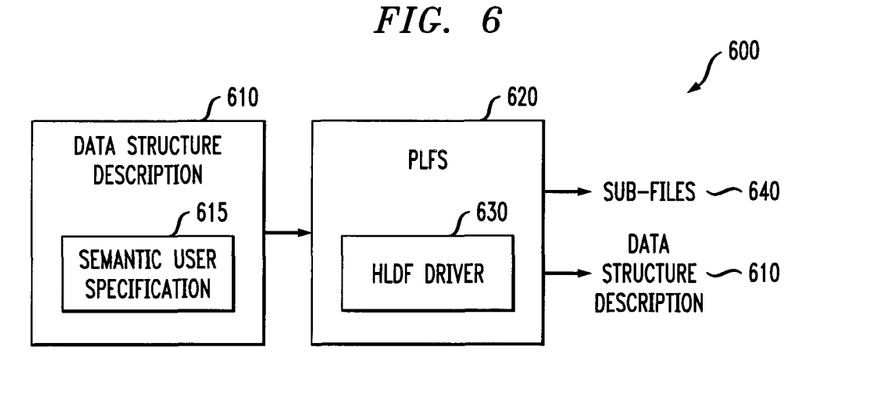
FIG. 6 is a block diagram illustrating an exemplary semantic file storage system that incorporates aspects of the present invention.

FIG. 6 is a block diagram illustrating an exemplary semantic file storage system 600 that incorporates aspects of the present invention. As shown in FIG. 6, a data structure description 610 containing a user specification 615 of semantic information related to a given file is applied to a Parallel Log-Structured File System (PLFS) 620. The PLFS 620 comprises an exemplary HLDF driver 630 for one or more high level data formatting libraries (HLDF), such as Message Passing Interface (MPI-IO), Hierarchical Data Format (HDF5) and/or pnetCDF (a library written on top of MPI-IO to create netcdf files). Generally, the high level data formatting library includes one or more functions to receive a data structure definition 610 (e.g., MPI_File_set_view). Given the data structure description 610 containing the semantic information 615, the PLFS 620 will know the semantics of each sub-file (i.e., what the data contains).

In addition, the high level data formatting library will serialize the data structure definition 610 into a linear array of bytes into and out of a storage device. For example, the high level data formatting library may use a call such as plfs_write( . . . ) that takes as arguments only the standard input/output parameters of a memory pointer and a length.

In accordance with the present invention, the PLFS 620 will export an expanded plfs_write( ) function that allows the high-level data formatting library to also pass the data structure description 610 containing the semantic information as well. Thus, the PLFS 620 generates one or more sub-files 640 and also outputs the data structure description 610 containing the semantic information 615 (in addition to the conventional file metadata of an offset and length). In this manner, the data structure description 610 containing the semantic information 615 can be stored with the sub-files in one or more storage nodes of the parallel computing system.

Multi-Resolution Replicas

As indicated above, another aspect of the invention generates one or more replicas of a file with different resolutions based on the semantic information. The file and corresponding replicas of the file can be stored in one or more storage nodes of a parallel computing system. In this manner, the parallel file system can export different views (e.g., a sub-set) of the data dynamically based on the needs of different workloads. Bandwidth is improved by sending only the relevant subset of data that is required by a given application.

Figure 7:
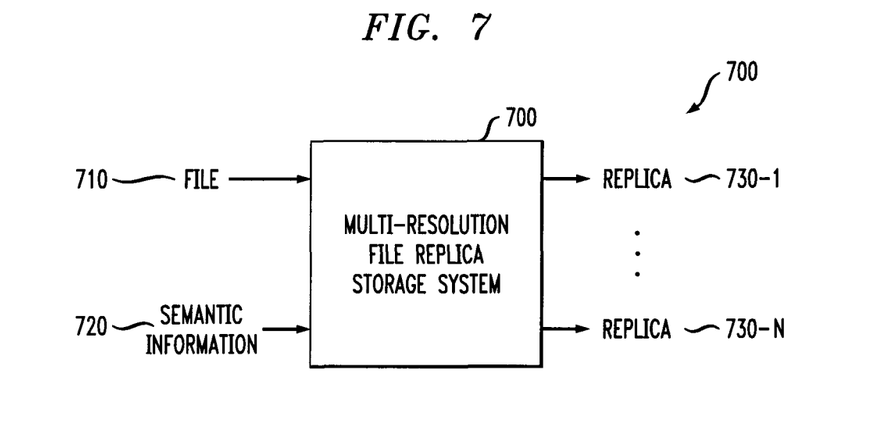
FIG. 7 is a block diagram illustrating an exemplary multi-resolution file replica storage system that incorporates aspects of the present invention.

FIG. 7 is a block diagram illustrating an exemplary multi-resolution file replica storage system 700 that incorporates aspects of the present invention. As shown in FIG. 7, a file 710 and corresponding semantic information 720 related to the file 710 (e.g., from the data structure description 610) is applied to the exemplary multi-resolution file replica storage system 700. The exemplary multi-resolution file replica storage system 700 generates a plurality of replicas 730-1 through 730-N of the file 710 with different resolutions based on the semantic information. Thereafter, the file 710 and/or the plurality of replicas 730 of the file can be stored in one or more storage nodes of a parallel computing system.

In one exemplary implementation, the exemplary multi-resolution file replica storage system 700 creates a replica 730 where each 64 bit float is reduced to a 32 bit integer. The resulting picture may provide sufficient resolution for a given application (50% data reduction and a 100% retrieval speed improvement).

In a further variation, assume the ocean sub-images 300 of FIG. 3 comprise three data elements (such as humidity, pressure and water temperature). A particular analysis process may only be interested in one data element. The exemplary multi-resolution file replica storage system 700 can optionally generate and store three replicas 730. A first replica 730-1 can store the humidity value, a second replica 730-2 can store the pressure value and a third replica 730-3 can store the temperature value. Each sub-file (having higher precision) corresponding to a given sub-image 300 can optionally be stored together with the three lower-precision replicas 730-1 through 730-3. An analysis process or query that only wants pressure data can retrieve the desired data more quickly by identifying the replica using the associated semantic information. In addition, lost data can be reproduced by merging the replicas 730.

In yet another variation, the different resolution replicas 730 can have a variable number of bits.

Replication in accordance with the present invention permits a faster restart. If a compute node 110 fails and the application must restart from the last checkpoint, then the restart will be faster since the last checkpoint can be obtained from the fast burst buffer (gold) layer 145.

When an application has been suspended and the last checkpoint is no longer on the burst buffer tier 145 and the application will resume, the job scheduler can instruct PLFS to pre-load the last checkpoint into the fast burst buffer layer 145 so that the restart is faster. This requires job scheduler integration but it is transparent to the application except that the application might observe faster performance.

If a compute node 110 and a burst buffer node 140 both fail at the same time, then the replicated blocks can still be used for fast restart, in two different ways. First, some blocks that are only replicated to the slower disk based storage system 150 will have to be re-fetched from the disk based storage system 150. However, the restart will still be faster since most of the blocks will be fetched from the fast burst buffers 140 and only those blocks from the single failed burst buffer 140 will need to be re-fetched more slowly from the hard disk drive layer 150. Second, some blocks might be replicated across multiple burst buffers 140 so they can then be re-fetched quickly.

According to another aspect of the invention, replicated blocks can be used in a burst buffer system 140 to improve data analysis. When analysis runs on the burst buffer 140 (or another node in the system 100), there are two ways that replicated blocks can improve performance. First, the replication can provide access to the nearest copy (in a similar mariner to existing Map-Reduce techniques). The replicas can be positioned nearby using job scheduler integration, in a similar manner to the restart. In addition, the semantics associated with each sub-file can be used to replicate data not on file offset delimiters but on semantically meaningful boundaries, such as sub-cells within a distributed multidimensional array. In this manner, the analysis can operate on the semantic divisions so data locality will be easier to predict, to ensure, and to exploit. For a more detailed discussion of storage tiering based on a user or application specification, see, for example, U.S. patent application Ser. No. 13/536,289, referenced above.

Among other benefits, the replicated blocks in accordance with the present invention can be used to speed up a job restart; to assist analysis, data resilience and data integrity; and to automatically migrate data without application explicit control. In addition, the specification of how and where a given file is stored can be scheduled according to a policy, for example, where a visualization analysis routine is requested to retain uncompressed data for a certain time.

Because PLFS files can be shared across many locations, data movement required to implement these functions can be performed more efficiently when there are multiple nodes cooperating on the data movement operations. Therefore, when this is run on a parallel system with a parallel language, such as MPI, PLFS can provide MPI versions of these functions which will allow it to exploit parallelism for more efficient data manipulation.

Among other benefits, the application does not have to consider the location of the replicas and as such replica location is transparent to the application.

CONCLUSION

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for storing at least one file generated by a distributed application in a parallel computing system, wherein said file comprises a plurality of sub-files, said method comprising the steps of:
    obtaining a user specification of semantic information related to said file;
    determining semantically meaningful sub-file boundaries for said plurality of sub-files based on said semantic information;
    providing said semantic information as a data structure description to a data formatting library write function, wherein said semantic information is dependent upon a content of said file; and
    storing said semantic information related to said file with additional metadata related to said file and with one or more of said sub-files using said determined semantically meaningful sub-file boundaries in one or more storage nodes of said parallel computing system.

2. The method of claim 1, wherein said semantic information provides a description of data in said file.

3. The method of claim 1, wherein said sub-files are replicated based on said semantically meaningful boundaries.

4. The method of claim 1, further comprising the step of processing a query using said semantic information.

5. The method of claim 1, further comprising the step of performing an analysis of said file using said semantic information.

6. The method of claim 1, wherein a replication strategy can be specified for each of said plurality of said sub-files.

7. The method of claim 1, wherein said one or more storage nodes reside on one or more tiers of a multi-tier storage system.

8. The method of claim 1, wherein said semantic information related to a given sub-file is stored with said corresponding sub-file.

9. An apparatus for storing at least one file generated by a distributed application in a parallel computing system, wherein said file comprises a plurality of sub-files, comprising:
    a memory; and
    at least one hardware device operatively coupled to the memory and configured to:
    obtain a user specification of semantic information related to said file;
    determine semantically meaningful sub-file boundaries for said plurality of sub-files based on said semantic information;
    provide said semantic information as a data structure description to a data formatting library write function, wherein said semantic information is dependent upon a content of said file; and
    store said semantic information related to said file with additional metadata related to said file and with one or more of said sub-files using said determined semantically meaningful sub-file boundaries in one or more storage nodes of said parallel computing system.

10. The apparatus of claim 9, wherein said semantic information provides a description of data in said file.

11. The apparatus of claim 9, wherein said sub-files are replicated based on said semantically meaningful boundaries.

12. The apparatus of claim 9, wherein said at least one hardware device is further configured to process a query using said semantic information.

13. The apparatus of claim 9, wherein said at least one hardware device is further configured to perform an analysis of said file using said semantic information.

14. The apparatus of claim 9, wherein said one or more storage nodes reside on one or more tiers of a multi-tier storage system.

15. The apparatus of claim 9, wherein said semantic information related to a given sub-file is stored with said corresponding sub-file.

16. A data storage system for storing at least one file generated by a distributed application in a parallel computing system, wherein said file comprises a plurality of sub-files, comprising:
    a hardware processing device for obtaining a user specification of semantic information related to said file;
    determining semantically meaningful sub-file boundaries for said plurality of sub-files based on said semantic information; and for providing said semantic information as a data structure description to a data formatting library write function, wherein said semantic information is dependent upon a content of said file; and
    a memory for storing said semantic information related to said file with additional metadata related to said file and with one or more of said sub-files using said determined semantically meaningful sub-file boundaries in one or more storage nodes of said parallel computing system.

17. The data storage system of claim 16, wherein said semantic information provides a description of data in said file.

18. The data storage system of claim 16, wherein said sub-files are replicated based on said semantically meaningful boundaries.

19. The data storage system of claim 16, wherein said processing device is further configured to process a query using said semantic information.

20. The data storage system of claim 16, wherein said processing device is further configured to perform an analysis of said file using said semantic information.

21. The data storage system of claim 16, wherein said one or more storage nodes reside on one or more tiers of a multi-tier storage system.

22. The data storage system of claim 16, wherein said semantic information related to a given sub-file is stored with said corresponding sub-file.

\* \* \* \* \*